US 8,732,724 B1

(12) United States Patent
Pohorsky et al.

(10) Patent No.: US 8,732,724 B1
(45) Date of Patent: May 20, 2014

(54) DELAYED RENDERING OF MESSAGES

(75) Inventors: Tom Pohorsky, Santa Cruz, CA (US);
Bala Vijayakumar, San Jose, CA (US);
Scott Lee, Bellevue, WA (US);
Srinivasan Ramachandran, Bangalore (IN)

(73) Assignee: EMC Corporation, Hopkinton, MA (US)

( * ) Notice: Subject to any disclaimer, the term of this patent is extended or adjusted under 35 U.S.C. 154(b) by 1519 days.

(21) Appl. No.: 11/811,274

(22) Filed: Jun. 8, 2007

(51) Int. Cl.
*G06F 9/54* (2006.01)
*G06F 17/20* (2006.01)

(52) U.S. Cl.
USPC .............................. 719/313; 704/8

(58) Field of Classification Search
CPC ............ G06F 9/4448; G06F 17/30654; G06F 17/30401
USPC .............................. 719/313; 704/8
See application file for complete search history.

(56) References Cited

U.S. PATENT DOCUMENTS

| | | | |
|---|---|---|---|
| 6,199,070 B1* | 3/2001 | Polo-Wood et al. ............... | 1/1 |
| 2002/0046240 A1 | 4/2002 | Graham et al. | |
| 2004/0139204 A1 | 7/2004 | Ergezinger et al. | |
| 2004/0220945 A1* | 11/2004 | Pioli et al. .................. | 707/100 |
| 2005/0137845 A1* | 6/2005 | Carroll et al. ................. | 704/2 |
| 2005/0138207 A1* | 6/2005 | Chen et al. ................... | 709/246 |
| 2005/0267738 A1* | 12/2005 | Wilkinson et al. ............. | 704/9 |
| 2006/0047499 A1* | 3/2006 | Chen et al. ................... | 704/8 |
| 2006/0095774 A1 | 5/2006 | Butterfield et al. | |
| 2006/0190493 A1 | 8/2006 | Kawai et al. | |
| 2007/0106998 A1 | 5/2007 | Zeldin et al. | |
| 2007/0244976 A1 | 10/2007 | Carroll et al. | |
| 2007/0299925 A1 | 12/2007 | Kirkland | |
| 2008/0222735 A1 | 9/2008 | Cohen et al. | |
| 2008/0222736 A1 | 9/2008 | Boodaei et al. | |

OTHER PUBLICATIONS

Hutchins, J., Machine Translation: History. In: Keith Brown, Encyclopedia of Language & Linguistics, 2nd Ed., vol. 7, pp. 375-383 (2006) [retrieved from http://www.hutchinsweb.me.uk/EncLangLing-2006.pdf on Aug. 11, 2010].*
Farghaly, A. and Shaalan, K., Arabic Natural Language Processing: Challenges and Solutions, ACM Transactions on Asian Language Information Processing, vol. 8, No. 4, Article 14 (Dec. 2009).*
Marasco, J., Software Development Productivity and Project Success Rates: Are We Attacking the Right Problem? (Feb. 15, 2006) [retrieved from http://www.ibm.com/developerworks/rational/library/feb06/marasco/index.html Aug. 11, 2010].*
Kelly, A., C by Dissection, Addison-Wesley Publishing Co., pp. 3-12, 361-378 (1996).*

(Continued)

*Primary Examiner* — H S Sough
*Assistant Examiner* — Brian W Wathen
(74) *Attorney, Agent, or Firm* — Van Pelt, Yi & James LLP

(57) ABSTRACT

Generating a message output is disclosed. An indication triggering generation of a message is received. A message output of the message is generated in a manner that allows the message to be rendered using a later determined context. Rendering a message is disclosed. An indication that a previously generated output of a message is desired to be rendered is received. The message rendered based at least in part on a context determined after the message output was generated.

12 Claims, 3 Drawing Sheets

(56) References Cited

OTHER PUBLICATIONS

IEEE 100: The Authoritative Dictionary on IEEE Standard Terms, 7th Ed. (2000), pp. 606, 649, 721.*
Stevens, W.R., UNIX Network Programming, vol. 1, 2nd Ed. (1998), pp. xv-xviii.*
Stevens, W.R., UNIX Network Programming, vol. 2, 2nd Ed. (1998), pp. 3-4.*
Matsubara, K.; Blanchard, B.; Nutt, P.; Tokuyama, M.; Niijima, T., "A Practical Guide for Resource Monitoring and Control (RMC)" (Aug. 2002), pp. 1-220 [retrieved from http://www.redbooks.ibm.com/pubs/pdfs/redbooks/sg246615.pdf].*
Pohorsky et al., U.S. Appl. No. 11/811,363, filed Jun. 8, 2007.
Gleb Naumovich, Preventing Piracy, Reverse Engineering, and Tampering, 2003, pp. 1-8.

* cited by examiner

DELAYED RENDERING OF MESSAGES

BACKGROUND OF THE INVENTION

A program message (e.g., status message, error message, log entry, text data for display to a user, etc.) generated in a network node is often generated in a specific format of the network node. For example, a message generated by a United States network node is generated in the English language, and a message generated by a Chinese network node is generated in the Chinese language. In a distributed network environment, multiple network nodes may generate messages to a same destination such as a log file, and/or a node may use a message received from another node to generate a new message. This allows the possibility of a message to contain a plurality of languages, and/or a message in one language to be grouped with another message of another language (e.g., log file with multi-language entries). A viewer of the message will be unable to completely understand the message or the group of messages unless the viewer understands all languages of the messages. Therefore, there exists a need for a better way to generate a message in a network environment.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Generating a message output is disclosed. In some embodiments, rendering a program code message to a specific format is delayed until the message is desired to be viewed. Instead of rendering a message when an indication for a message is detected, a rendering-format independent message output is generated in response to the indication. The rendering-format independent message output is generated at least in part by using a user-visible text message specified in program code. An example of the program code includes code generated using a function-oriented programming language such as the C programming language. Other examples of the program code include code generated using an object oriented programming language and/or a scripting programming language. The message output can be used to render the message at a later time in a later determined context and/or format. For example, a text message specified in program code is outputted with data that can be used to render the text message in a plurality of rendered formats such as a plurality of languages. Rendering the message output includes processing the message output to display the message content to a viewer.

Figure 1:
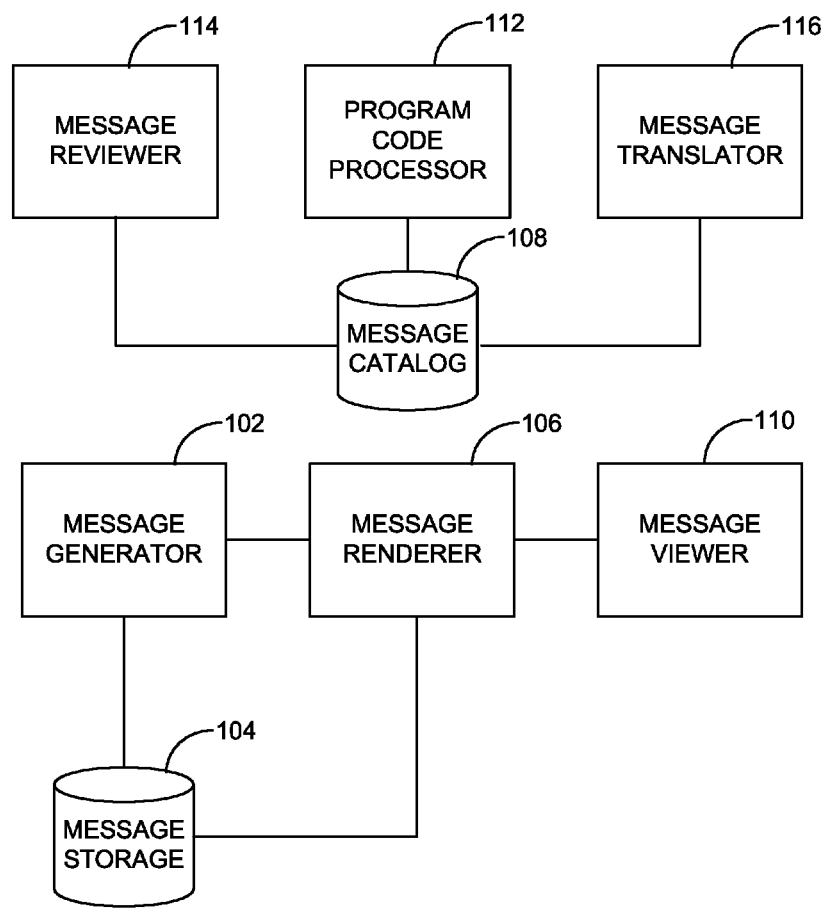
FIG. 1 is a block diagram illustrating an embodiment of a program code message environment.

FIG. 1 is a block diagram illustrating an embodiment of a program code message environment. Message generator 102 generates one or more rendering-format independent message outputs. In some embodiments, message generator 102 executes at least a portion of program code that includes a specification of a message to be generated. For example, using a syntax of a programming language, a programmer specifies the message for output when a program/process of the program code is executed. The message output generated by generator 102 is stored in message storage 104. For example, the message output is stored in a log file in storage 104. In some embodiments, the message output is stored in storage 104 not as an end destination but as temporary destination before the generated message output is used to render the message in a desired format. For example, an error message to be displayed to a user is temporary stored in message storage 104 before being sent to be rendered for a viewer in a desired language.

Message renderer 106 renders a message output stored in message storage 104. In some embodiments, message renderer 106 renders the message output in response to a request for the message output to be viewed. Rendering the message includes displaying the message in a determined context. Message catalog 108 includes data that can be used to render a message. In some embodiments, foreign language translations of a message are stored in message catalog 108. A plurality of message catalogs may be used. In the example shown, message catalog 108 is used at least in part to render the message. Message catalog 108 is optional. Message viewer 110 is to view the rendered message. Examples of message viewer 110 include a log viewer, a message dialog, and any other interface that can be used to view a rendered message.

Program code processor 112 processes program code to identify and manage messages defined in the program code. For example, one or more messages specified in program code are identified and added to message catalog 108 by processor 112. Message reviewer 114 reviews messages stored in message catalog 108. For example, the messages are reviewed for grammar, spelling, readability, correctness, and/or compliance. Message translator 116 translates one or more messages stored in catalog 108. The translated messages may be stored in catalog 108, another message catalog, and/or in another destination. In various embodiments, program code processor 112, message reviewer 114, and/or message translator 116 are optional.

Figure 2:
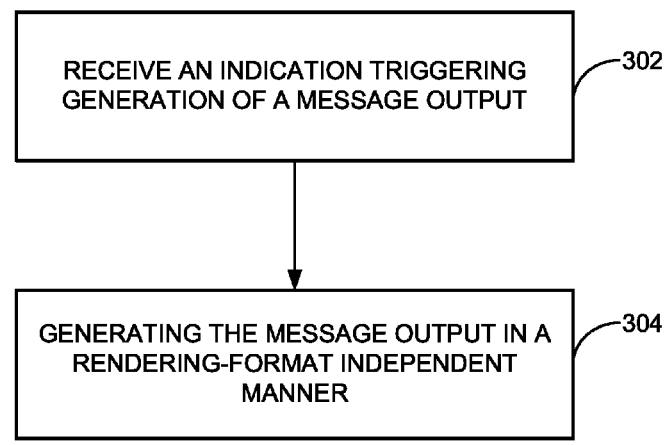
FIG. 2 is flowchart illustrating an embodiment of a process for generating a message output.

FIG. 2 is flowchart illustrating an embodiment of a process for generating a message output. In some embodiments, the process of FIG. 2 is implemented in message generator 102 of FIG. 1. At 202, an indication triggering generation of a message output is received. In some embodiments, the indication specifies a desire to perform one or more of the following: log an event, display a status message, display an alert message, display an error message, write a message to a file, and display a message to a user. In some embodiments, the indication was generated in response to a computer program/process event. Traditionally the indication had been associated with outputting the message in a specific rendering format. At 204, the message output is generated in a rendering-format independent manner. Different transformations, translations, and/or formats of the message can be rendered using the same message output. For example, the message output includes a message identifier that can be used to obtain and render the message in a desired format from a plurality of possible formats associated with the message identifier. Since the message output is rendering-format independent, the message output can be used to render the message at a later time in a later determined context. For example, the message output can be used at a later time to render the message in a viewer's language environment by obtaining a desired translation of the message from a plurality of foreign language translations of the message.

In some embodiments, the message is specified in program code using a specification of a message form and associated metadata. The message form defines the content and/or structure of the message. For example, the message form defines the text to be rendered along with contents of one or more message argument variables, if any. To display "Hello" with a name of a person to be dynamically obtained from a program code variable, the following C programming language statement can be used: printf("Hello % s", name). "Hello % s" is the message form and "name" is the argument of the message. In some embodiments, although the message form is specific to a default rendering format of the message, the message can be rendered in other formats. For example, the message form is in an English language format, but the message can be rendered in other languages. In some embodiments, the message metadata includes one or more of the following: a message type identifier, a time stamp, a thread identifier, a process identifier, an identifier of a message group, an identifier of a host, an identifier of a program, an identifier that can be used to uniquely identify the message, and one or more argument identifiers of the message. In some embodiments, the message output includes contents of the one or more message arguments at the time the message output was generated. For example, contents of one or more variables used as message arguments are stored in the message output. The message argument contents stored in the message output are not substituted in a message form of the message until the message is rendered.

Figure 3:
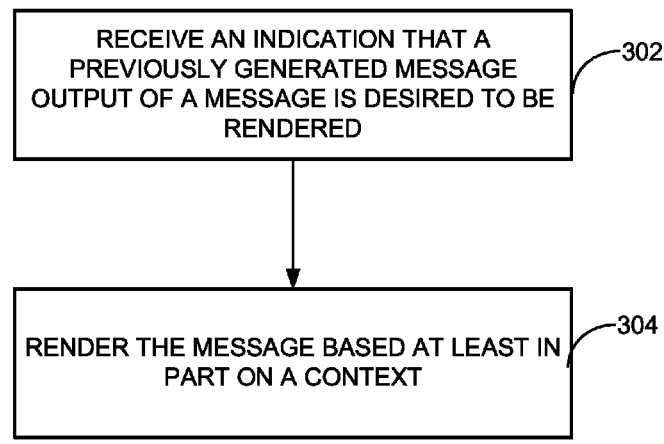
FIG. 3 is flowchart illustrating an embodiment of a process for rendering a message.

FIG. 3 is flowchart illustrating an embodiment of a process for rendering a message. In some embodiments, the process of FIG. 3 is implemented in message renderer 106 of FIG. 1. At 302, an indication that a previously generated message output of a message is desired to be rendered is received. The indication is generated due to a request to view a message and/or display a message on an interface. For example, an indication that a log file is desired to be viewed is received. In some embodiments, the indication of 302 is associated with the indication in 202 of FIG. 2. At 304, the message is rendered based at least in part on a context. Rendering the message includes displaying at least a portion of the message to a user. In some embodiments, the rendering is performed by a process/application separate from the process/application that generated the message output. In some embodiments, the context is determined using information associated with a viewer of the message. The context information can be determined automatically and/or specified by the viewer. For example, a rendering language associated with the viewer is determined using an explicit specification of a viewer's language preference included in a source such as a profile or a received preference, and/or the rendering language is determined using an implicit data such a geographical location of the viewer. In some embodiments, the context is determined at a time after the message output was generated. For example, the context is determined in response to receiving the indication to render the message. In some embodiments, the context is determined using one or more environment variables such as time, date, day of week, weather, other data that can used as a reference.

In some embodiments, rendering the message includes using a message identifier included in the message output and an identifier of the rendering context to obtain an entry in a message catalog containing the message in the desired rendering format. If the desired rendering format is not available, an error is generated and/or a default rendering format is provided. In some embodiments, there exist a plurality of message catalogs, and a determination of which message catalog to use is based at least in part on the message identifier and/or the context identifier. For example, the context identifier is used to select a specific message catalog, and the message identifier is used to identify an entry in the selected catalog. The message catalog includes one or more messages based at least in part on one or more messages specified in program code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of generating a message output, comprising:
   receiving using a processor an indication triggering generation of a message, wherein the message is specified:
   1) in program code configured to generate the message in response to the indication; and
   2) comprising a message form that includes text to be rendered specific to a native rendering format, along with contents of one or more message arguments;
   generating using a processor a message output of the message in a manner that allows the message to be rendered using a later determined context, wherein:
   1) the later determined context is not known at a message generation time at which the message is generated;
   2) the message output includes a message identifier; and
   3) the message identifier can be used to render the message in a desired format from a plurality of rendering formats associated with the message identifier;
   storing the message output;
   receiving using a processor an indication the message is desired to be rendered;
   determining the later determined context in which the message is to be rendered, based at least in part on an implicit data associated with a geographical location of a viewer of the message when the message is desired to be rendered;
   using the later determined context at least in part to select a desired rendering format from the plurality of rendering formats associated with the message identifier;
   using the message identifier and the later determined context to obtain from a message catalog an entry containing the message in a rendering language associated with the desired rendering format; and
   rendering the message using a processor in the desired rendering format, wherein the message form in the native rendering format is transformed to the desired rendering format to render the message at least in part using the entry from the message catalog.

2. A method as recited in claim 1, wherein the message output includes data that can be used to render the message in a plurality of foreign language translations of the message.

3. A method as recited in claim 1, wherein the message output is not specific to at least one format in which the message output is usable to render the message.

4. A method as recited in claim 1, wherein the program code is generated using a function-oriented programming language.

5. A method as recited in claim 1, wherein the specification of the message includes one or more of the following: a message type identifier, a time stamp, a thread identifier, a process identifier, an identifier of a message group, an identifier of a host, an identifier of a program, an identifier that can be used to uniquely identify the message, and one or more argument identifiers of the message.

6. A method as recited in claim 1, wherein storing the message output comprises storing the message output in a log file.

7. A method as recited in claim 1, wherein the indication is associated with a desire to perform one or more of the following: log an event, display a status message, display an alert message, a display an error message, write a message to a file, and display a message to a user.

8. A method as recited in claim 1, wherein determining the context includes determining a language and rendering the message includes obtaining a translation of the message in the determined language.

9. A method as recited in claim 1, wherein the context is determined substantially when the message is desired to be rendered.

10. A method as recited in claim 1, wherein the implicit data also comprises a profile associated with the viewer.

11. A system for generating a message output, comprising:
a first processor configured to:
receive an indication triggering generation of a message, wherein the message is specified:
1) in program code configured to generate the message in response to the indication; and
2) comprising a message form that includes text to be rendered specific to a native rendering format, along with contents of one or more message arguments; and
generate a message output of the message in a manner that allows the message to be rendered using a later determined context, wherein:
1) the later determined context is not known at a message generation time at which the message is generated;
2) the message output includes a message identifier; and
3) the message identifier can be used to render the message in a desired format from a plurality of rendering formats associated with the message identifier;
a second processor configured to:
store the message output;
receive an indication the message is desired to be rendered;
determine the later determined context in which the message is to be rendered, based at least in part on an implicit data associated with a geographical location of a viewer of the message when the message is desired to be rendered;
use the later determined context at least in part to select a desired rendering format from the plurality of rendering formats associated with the message identifier;
use the message identifier and the later determined context to obtain from a message catalog an entry containing the message in a rendering language associated with the desired rendering format; and
render the message using a processor in the desired rendering format, wherein the message form in the native rendering format is transformed to the desired rendering format to render the message at least in part using the entry from the message catalog; and
a memory coupled with the first processor, wherein the memory is configured to provide the processor with instructions.

12. A computer program product for generating a message output, the computer program product being embodied in a non-transitory computer readable medium and comprising computer instructions for:
receiving an indication triggering generation of a message, wherein the message is specified:
1) in program code configured to generate the message in response to the indication; and
2) comprising a message form that includes text to be rendered specific to a native rendering format, along with contents of one or more message arguments;
generating a message output of the message in a manner that allows the message to be rendered using a later determined context, wherein:
1) the later determined context is not known at a message generation time at which the message is generated;
2) the message output includes a message identifier; and
3) the message identifier can be used to render the message in a desired format from a plurality of rendering formats associated with the message identifier;
storing the message output;
receiving using a processor an indication the message is desired to be rendered;
determining the later determined context in which the message is to be rendered, based at least in part on an implicit data associated with a geographical location of a viewer of the message when the message is desired to be rendered;
using the later determined context at least in part to select a desired rendering format from the plurality of rendering formats associated with the message identifier;
using the message identifier and the later determined context to obtain from a message catalog an entry containing the message in a rendering language associated with the desired rendering format; and
rendering the message using a processor in the desired rendering format, wherein the message form in the native rendering format is transformed to the desired rendering format to render the message at least in part using the entry from the message catalog.

* * * * *